Oct. 26, 1971  G. W. QUERY  3,614,841
EXTERMINATION METHOD
Filed July 25, 1969  2 Sheets-Sheet 1
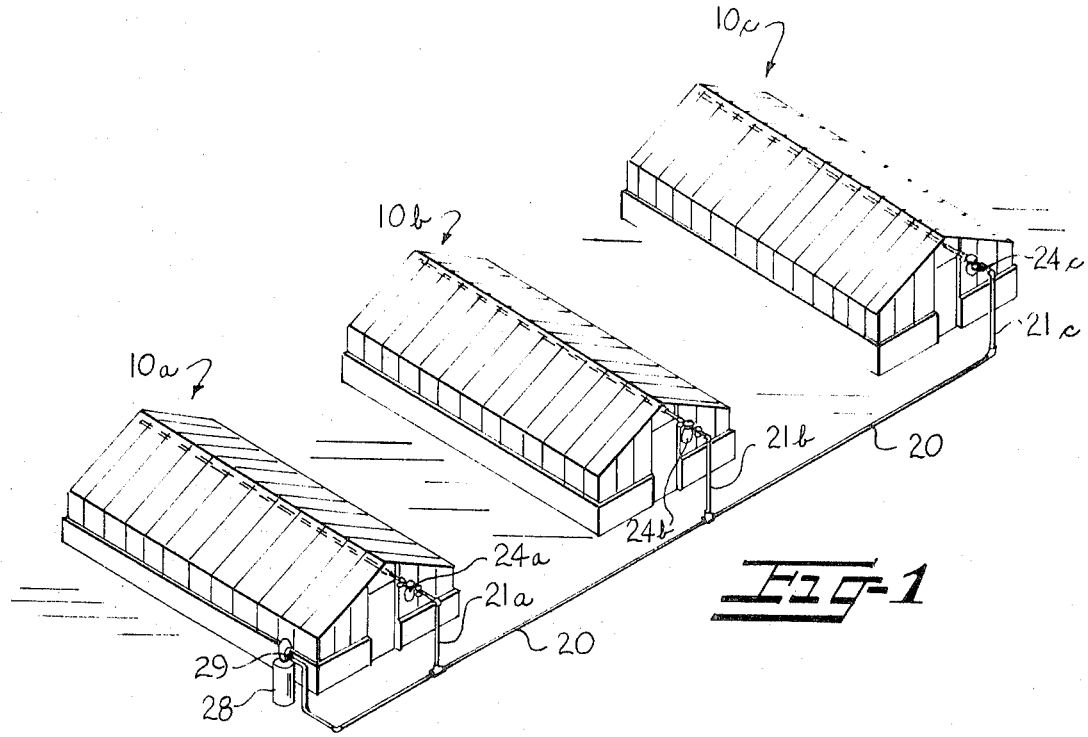
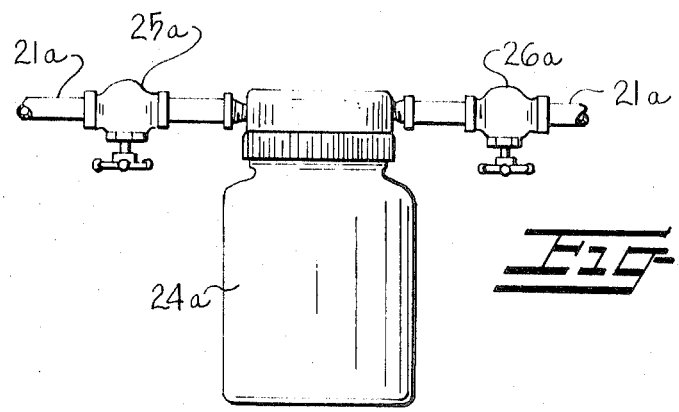
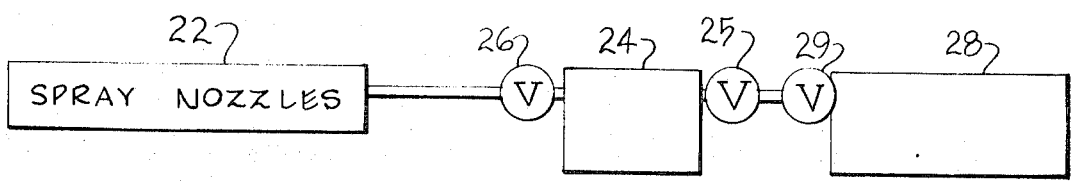
INVENTOR:
GRADY W. QUERY
BY Parrott, Bell, Seltzer, Park & Gibson
ATTORNEYS

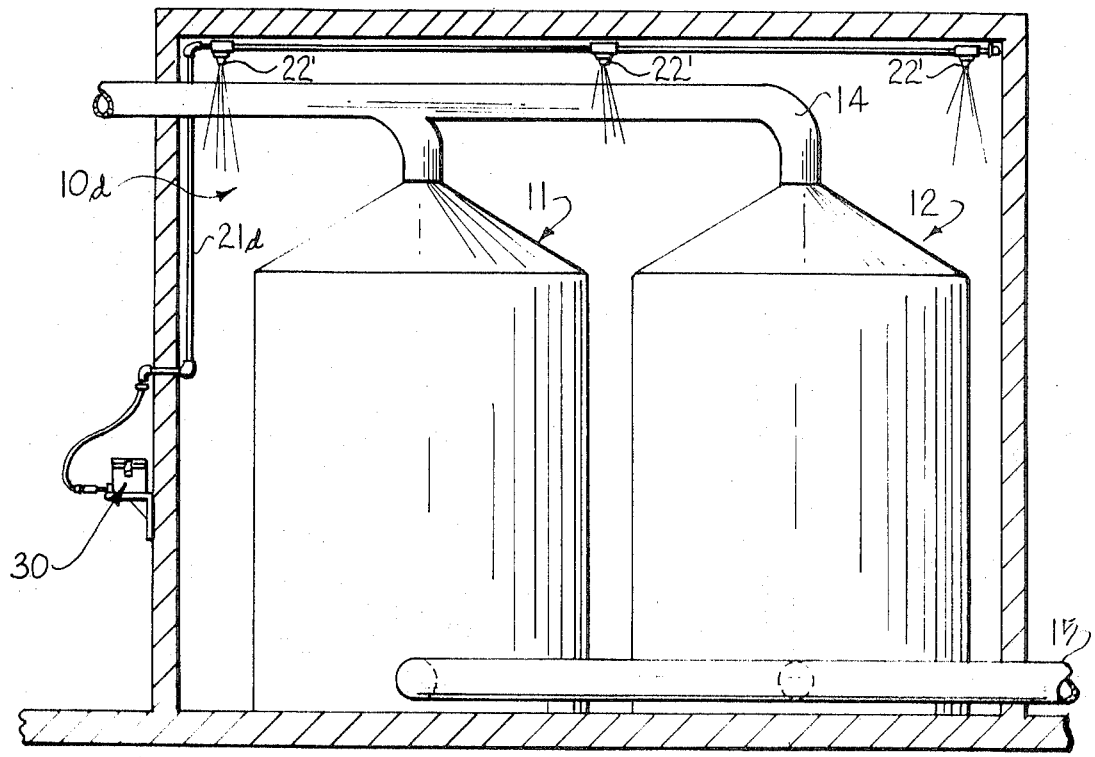
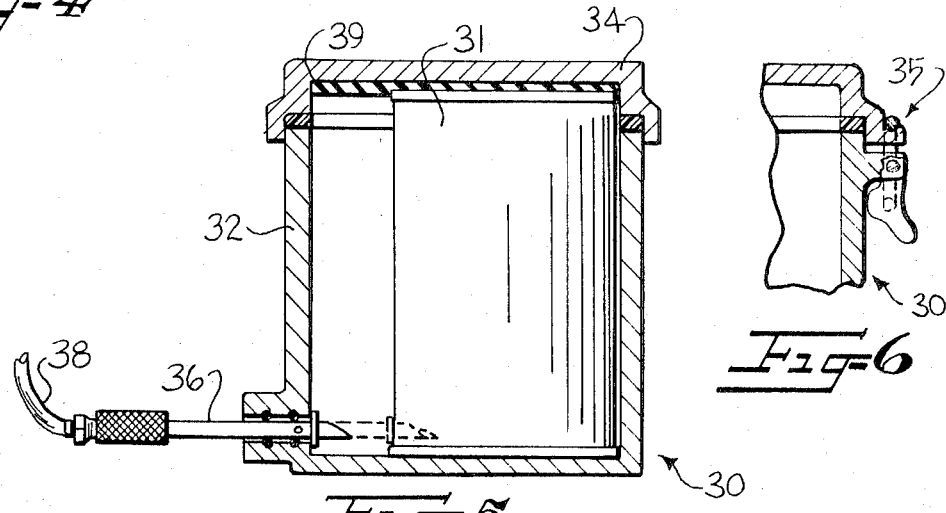

United States Patent Office 3,614,841
Patented Oct. 26, 1971

3,614,841
EXTERMINATION METHOD
Grady W. Query, P.O. Box 12452,
Charlotte, N.C. 28205
Filed July 25, 1969, Ser. No. 844,753
Int. Cl. A01m *13/00*
U.S. Cl. 43—124
4 Claims

ABSTRACT OF THE DISCLOSURE

A method of exterminating insects within a building wherein a predetermined weight of insecticide is dispersed through a permanently installed distribution system at predetermined periodic intervals in order to insure continuing extermination of insects without exposure of materials stored within the building to excessively high concentrations of the insecticide.

---

The avoidance of contamination of materials by insect infestation has long been a problem in various industries, such as the food processing industry as to grain products such as flour and the like and the floral industry as to planting materials such as seed beds. In order to avoid such infestation, it is preferred practice to exterminate insects within buildings wherein such materials are stored or are being handled. While such extermination of insects is recognized as desirable in order to avoid infestation, a counterbalancing problem is the necessity of avoiding such concentration of insecticide as may lead to contamination of foodstuffs supposedly being protected against insect infestation or to damage of other materials. Ideally, insect extermination under such circumstances represents a careful balance between these considerations.

As a practical matter, the extermination of insects in such industries as the food handling or food processing industries has not, prior to the present invention, approached the careful balance which would be recognized as desirable. In point of fact, typical extermination programs being followed are less than ideal in that they err on the side of avoidance of contamination of foodstuffs with insecticide materials, and thus expose foodstuffs to a much greater danger of contamination by insect infestation than is ideally acceptable. The difficulty which has led to this being the industry-wide practice lies in control over the quantities of insecticide applied in exterminating insects. Heretofore, the practices available for applying insecticide have not provided adequate or accurate control over the quantities used. Thus, the industry has accepted practices which are directed to periodic overdoses of insecticide and result in wastage of food products in hopes that such periodic overkill would provide at least a certain amount of residual protection for an indeterminable interval before the infestation of the food product became sufficiently advanced as to require another drastic retreatment. Similar problems and similar approaches to solving them are known to occur in other industries, with no more success.

With the above identified problems and difficulties having been recognized, it is an object of the present invention to provide a method of exterminating insects within a building structure wherein continuing extermination of insects otherwise infesting materials in the building may be obtained without increasng the dosage of insectcde materials to such a level as to raise dangers of contamination. In realizing this object of the present invention, predetermined weight quantities of insecticide materials are dispersed into a closed space within the building structure through a permanently installed distribution system at predetermined periodic intervals, with the weights and intervals being so determined that a predetermined dosage of insecticide is applied to the closed space and continuing extermination of insects therein is thereby insured. Preferably, and in accordance with the present invention, delivery of measured amounts of insecticide is obtained by premeasuring the insecticide in aerosal containers, together with a propellant for dispersing the insecticide through the permanently installed distribution system.

Some of the objects and advantages of the invention having been stated, others will appear as the description proceeds, when taken in connection with the accompanying drawings, in which—

FIG. 1 is a perspective view of an application of the insecticide distribution system of the present invention to muiltiple biuldings, such as a number of greenhouses;

FIG. 2 is an elevation view of a portion of the insecticide distribution system of FIG. 1;

FIG. 3 is a schematic diagram of the distribution system of FIGS. 1 and 2;

FIG. 4 is an elevation view, in partial section, of another application of a distribution system in accordance with this invention, as in a foodstuff storage building;

FIG. 5 is an elevation view, in partial section, through a portion of the distribution system of FIG. 4; and FIG. 6 is a partial section of the embodiment illustrated in FIG. 5 and showing a latch arrangement.

Referring now more particularly to the drawings, the manner in which the method of the present invention is practiced will be described with reference to illustrations of the application of the method to extermination of closed spaces in a plurality of buildings, such as greenhouses, and with regard to extermination within a closed storage room or building wherein foodstuff processing is being carried out. More particularly, FIG. 1 illustrates a plurality of greenhouses 10*a*, 10*b* and 10*c* which are normally employed in the floral industry, while FIG. 4 illustrates a closed storage room 10*d* within a building where foodstuff processing is being carried out. The enclosed spaces defined by the various biuldings and rooms 10*a*, 10*b*, 10*c* and 10*d* are treated for the extermination of insects in acordance with the method of the present invention ,as will now be described.

As to the three greehouses 10*a*, 10*b*, 10*c*, a conduit system is permanently installed to serve the enclosed spaces defined within the greenhouses and includes a main header conduit 20. Leading from the main header conduit 20 are a plurality of branch conduits 21*a*, 21*b* and 21*c*, each preferably serving a single one of the greenhouses 10*a*, 10*b*, 10*c*. Each of the conduits 21 leads into the interior of the corresponding one greenhouse and has a predetermined number of spray nozzles (schematically illustrated as spray nozzles 22 in FIG. 3) installed along the length of the conduit within the greenhouse.

Interposed in each of the conduits 21*a*, 21*b* and 21*c* is a dosage measuring volume defined by a corresponding container 24*a*, 24*b*, 24*c*, one of which is shown more particularly in FIG. 2 where portions of the conduit system serving one particular greenhouse 10*a* are shown in elevation. The container 24*a* may be constructed in any suitable manner appropriate to withstand the pressures applied thereto, as described more fully hereinafter, and preferably is of steel or similar heavy-duty metal. The dosage measuring volume within the container 24*a* may be isolated from other portions of the conduit 21*a* by closure of communication controlling valves 25*a* and 26*a* on the upstream and downstream or inlet and outlet sides of the dosage measuring volume.

The above described distribution system including the main header conduit 20 and the branch conduits 21*a*, 21*b*, 21*c* having the dosage measuring containers 24*a* and associated valves 25*a* and 26*a* are permanently installed with the greenhouses 10*a*, 10*b*, 10*c*, in order that the structure necessary to follow the method of the present invention will always be at hand.

In following the method of the present invention as applied to the structure illustrated in FIG. 1, insecticide and a suitable gas propellant are prepackaged into a bulk container 28, such as a one hundred or two hundred pound cylinder provided with a flow control valve 29 (FIGS. 1 and 3).

In operation and in accordance with the present invention, the bulk container 28 is secured to the main header conduit 20 for admitting insecticide and propellant gas thereinto. The control valve 29 on the bulk container 28 may then be opened, to admit a flow of insecticide and propellant into the header conduit and into the branch conduits 21a, 21b, 21c. Thereafter, the inlet valve 25a associated with a dosage measuring volume container 24a is opened to admit into the container 24a that quantity of insecticide and propellant gas appropriate to fill the volume within the container 24a. The inlet valve 25 is then closed.

At this point, a predetermined measured quantity of insecticide material and a measured quantity of propellant gas appropriate thereto are contained within the dosage measuring volume defined by the container 24a. In accordance with the present invention, the volume within the container 24a, and thus the measured dosage of materials, is predetermined and a different size container may be substituted as required in order to vary the predetermined measured volume of the insecticide and propellant gas.

Thereafter, the outlet valve 26a between the measuring container 24a and the enclosed space to be treated is opened, for the passage of the measured dosage of insecticide through a distribution conduit 21a to the spray nozzles 22 distributed throughout the area to be treated. In accordance with the present invention, the admission of insecticide and propellant gas from the measuring container 24a by opening the outlet valve 26a includes exhausting the contents of the dosage measurement volume into the conduit communicating with the space to be treated. By sizing the spray nozzles 22 in predetermined correlation to the area to be treated and by spacing the spray nozzles 22 along the branch conduit 21 to achieve an even distribution of the insecticide materials, such exhaustion of the measured dosage attains a predetermined dosage level throughout the enclosed spaces being treated. It is to be noted that a significant safety advantage is provided for the treating personnel in that the treatment is performed without entering the treated space.

In accordance with the present invention, the premeasuring and exhaustion of predetermined weights of insecticide material and quantities of propellant gas appropriate thereto is repeated at predetermined time intervals as required to maintain the desired dosage level. This dosage level is determined from information regarding the toxicity of the materials used and the rate of dispersion or loss of effectiveness of the materials.

The operation of the method of the present invention is illustrated in a somewhat different environment in FIGS. 4 and 5 of the application drawings. As there applied, an enclosed space 10c within a conventional building structure is to be treated, in order to prevent infestation of foodstuffs such as flour or the like stored in bins or elevators 11, 12 within the enclosed space 10d. Typical installations of flour bins and the like include inlet and outlet conduits 14 and 15, respectively, through which flowable foodstuffs are directed to and removed from the storage bins or elevators 11, 12. While such communicating conduits are illustrated in the application drawings, it is to be understood that the application of the invention is not limited to the particular features of the foodstuff storage system.

Permanently installed within the enclosed space 10d is a distribution conduit 21d having a plurality of spray nozzles 22' mounted thereon in predetermined relationship to the area of the enclosed space 10d. Preferably, the conduit 21d penetrates the wall of the enclosed space 10d, and means are provided outside the enclosed space for the admission of premeasured quantities of insecticide material into the distribution conduit 21d.

The insecticide admitting means, indicated generally by the reference character 30, is particularly adapted for the use of prepackaged aerosol containers of relatively small size, such as are employed in the prepackaging of small predetermined weights of insecticide materials on the order of 1, 2 or 5 pounds. Such relatively small predetermined weights of insecticide materials are frequently packaged by sealing the material and an appropriate quantity of gas propellant into a relatively small can, to be dispensed by opening a valve provided in the can or by otherwise establishing communication with the interior of the can. Aerosol containers of this general type are quite widely known and used in the packaging and distribution of a number of household chemicals. In the illustrated embodiment, the aerosol container 31 is of the sealed can type wherein no valve is provided in the can, to guard against accidental discharge of the contents of the can.

To establish operative communication between the interior of the aerosol container 31 and the distribution conduit 21d and exhaust the insecticide and gas propellant from the container into the distribution system, the means 30 comprises an enclosure 32 having a lid 34 which may be locked into sealing engagement with the enclosure 32, as by means of a toggle latch 35. Mounted in the wall of the enclosure 32, for movement relative to an aerosol container 31 disposed therewithin, is a puncturing opener 36 which operatively communicates with the distribution conduit 21d by means of a flexible conduit portion 38.

Appropriate seal means are provided between the closure member 34 and the enclosure 32 and surrounding the relatively movable puncturing opener 36 in order to insure that escape of insecticide material from within the enclosure 32 is precluded during use of the apparatus. Further, an elastomeric lining member 39 is preferably provided within the closure member 34 of the enclosure 43 and the interior of the enclosure member 32 is dimensioned to receive the height of the aerosol containers 31 and to accommodate the varying diameters thereof.

In use of the system illustrated in FIGS. 4 and 5, the structural elements described heretofore are permanently installed in the building including the enclosed space 10d. Thereafter, at predetermined intervals, aerosol containers having predetermined weights of insecticides and gas propellant packaged therein are placed into the enclosure 32 and locked into position by means of the closure 34 and latch 35. The penetrating member 36 is then driven through the wall of the aerosol container 31 (by movement from the solid line position of FIG. 5 to the dotted line of FIG. 5) so that the aerosol container is attached to the distribution system. The contents of the aerosol container 31 are exhausted therefrom and into the distribution system and are dispersed through the spray nozzles 22' into the closed space 10d, so that a predetermined dosage of insecticide is applied to the closed space and continuing extermination of insects thereby insured. That number of containers as are required to deliver the needed weight of insecticide are successively exhausted through the distribution system at any given dosing. Should it be desired for safety purposes to flush the permanently installed lines between dosings, containers having only propellant gas therein may be prepared and exhausted through the distribution system after delivery of the needed weght of insecticide.

It is apparent that the discussion above has set forth a method of continuing extermination treatment for closed spaces within building structures which attains a controlled concentration level of insecticide materials within the space being treated, and thereafter maintains the controlled concentration level by application of predetermined quantities of insecticide materials at predetermined time intervals. Such a method of extermination is substantially superior to prior art methods wherein the dosage applied frequently is excessive and results in endangering goods or personnel present in the treated areas.

In the drawings and specification there have been set forth preferred embodiments of the invention, and although specific terms are employed, they are used in a generic and descriptive sense only and not for purposes of limitation:

What is claimed is:

1. A method of exterminating insects within a building structure comprising the steps of permanently installing in the building structure a distribution system of operatively communicating conduits having outlets spaced therealong in predetermined communicatign relationship to a closed space within the building structure, premixing an insecticide and a propellant gas and feeding a measured amount of premixed insecticide and propellant gas into a closed container of predetermined volume, confining the measured amount of insecticide and propellant gas in the closed container, and thereafter at predetermined periodic intervals exhausting the confined contents of such a closed container into the distribution system so that a predetermined dosage of insecticide is applied to the closed space and continuing extermination of insects is thereby assured.

2. A method according to claim 1 wherein the step of confining insecticide and propellant gas includes premeasuring into the container a desired predetermined weight of insecticide and pressurizing the contained with propellant gas.

3. A method according to claim 2 wherein the step of premeasuring insecticide comprises measuring into the container that weight of insecticide which is required for a single, full application of the predetermined dosage together with that quantity of propellant gas which is required for dispersal thereof.

4. A method according to claim 2 wherein the step of exhausting insecticide into the distribution system further includes exhausting into the system that number of containers of insecticide which is required to bring the total weight of insecticide delivered to the predetermined dosags amount.

References Cited

UNITED STATES PATENTS

| 2,862,765 | 12/1958 | Wing | 43—124 X |
| 3,330,062 | 7/1967 | Carter | 43—124 |

WARNER H. CAMP, Primary Examiner